US010119331B2

(12) United States Patent
Desfossez

(10) Patent No.: US 10,119,331 B2
(45) Date of Patent: Nov. 6, 2018

(54) METHODS FOR CONFIGURING AND CONTROLLING THE OPERATION OF A MOTORISED DRIVE DEVICE FOR A HOME AUTOMATION UNIT, AND ASSOCIATED UNIT AND MOTORISED DRIVE DEVICE

(71) Applicant: SOMFY ACTIVITES SA, Cluses (FR)

(72) Inventor: Benjamin Desfossez, Cluses (FR)

(73) Assignee: SOMFY ACTIVITIES SA, Cluses (FR)

( * ) Notice: Subject to any disclaimer, the term of this patent is extended or adjusted under 35 U.S.C. 154(b) by 0 days.

(21) Appl. No.: 15/571,121

(22) PCT Filed: May 3, 2016

(86) PCT No.: PCT/EP2016/059902
§ 371 (c)(1),
(2) Date: Nov. 1, 2017

(87) PCT Pub. No.: WO2016/177736
PCT Pub. Date: Nov. 10, 2016

(65) Prior Publication Data

US 2018/0171711 A1 Jun. 21, 2018

(30) Foreign Application Priority Data

May 4, 2015 (FR) ..................................... 15 53976

(51) Int. Cl.
*H02K 7/14* (2006.01)
*E06B 9/72* (2006.01)
*E06B 9/40* (2006.01)
*E06B 9/68* (2006.01)

(52) U.S. Cl.
CPC .................. *E06B 9/72* (2013.01); *E06B 9/40* (2013.01); *E06B 2009/6854* (2013.01)

(58) Field of Classification Search
CPC ........................................................ E06B 9/72
USPC ....................................................... 318/3, 34
See application file for complete search history.

(56) References Cited

U.S. PATENT DOCUMENTS 9,665,084 B2 * 5/2017 Lagarde .................... E06B 9/72
2004/0124801 A1 7/2004 Jurado et al.

FOREIGN PATENT DOCUMENTS

FR 2 849 553 A1 7/2004

OTHER PUBLICATIONS

International Search Report, dated Jul. 18, 2016, from corresponding PCT/EP2016/059902 application.
FR Search Report, dated Apr. 7, 2016, from corresponding FR 1553976 application.

* cited by examiner

*Primary Examiner* — David S Luo
(74) *Attorney, Agent, or Firm* — Young & Thompson

(57) ABSTRACT

Disclosed is a method for configuring a motorized drive device for a closure or solar protection unit, the method including: a step in which a low end-of-travel position of a screen is determined automatically; a step in which the magnitude of an electric current passing through an electric motor is measured by a measurement device; a step in which a variation in the value magnitude is determined; and a step in which an obstacle-detection threshold value is determined during the movement of the screen towards its unwound position, according to the variation in the measured magnitude.

12 Claims, 4 Drawing Sheets

METHODS FOR CONFIGURING AND CONTROLLING THE OPERATION OF A MOTORISED DRIVE DEVICE FOR A HOME AUTOMATION UNIT, AND ASSOCIATED UNIT AND MOTORISED DRIVE DEVICE

The present invention relates to a method for configuring a motorized drive device for a closure or sun-protection home-automation installation, a method for controlling the operation of such a motorized drive device configured according to the aforementioned configuration method, a motorized drive device of a closure or sun-protection home-automation installation, and a closure or sun-protection home-automation installation incorporating such a motorized drive device.

In general, the present invention relates to the field of concealment devices comprising a motorized drive device setting a screen in motion between at least one first position and one second position.

A motorized drive device comprises an electromechanical actuator for a movable element for closing, concealing or providing sun protection such as a blind or any other equivalent material, hereinafter referred to as a screen.

Motorized drive devices for a closure or sun-protection home-automation installation are known. Such home-automation installations comprise a concealing device. The concealing device comprises a winding tube, a screen and a load bar. A first end of the screen is fastened to the winding tube. Additionally, a second end of the screen is fastened to the load bar.

The motorized drive device comprises an electromechanical actuator making it possible to wind and unwind the screen on the winding tube, between a wound position and an unwound position. The electromechanical actuator comprises an electric motor, an output shaft connected to the winding tube of the concealing device and an electronic control unit.

The electronic control unit comprises a device for measuring the rotation speed of a rotor of the electric motor.

When configuring the motorized drive device, the electronic control unit of the electromechanical actuator carries out a step for automatically determining end-of-travel positions of the screen.

The automatic determination of the end-of-travel positions of the screen is carried out by analyzing the variation in the rotation speed of the rotor of the electric motor of the electromechanical actuator.

For such motorized drive devices, the torque from the electromechanical actuator is determined, in particular by the installer, based on the size of the concealing device, and in particular, using an abacus taking account of the weight of the load bar and the diameter of the winding tube.

However, these motorized drive devices have the drawback of associating a single obstacle detection threshold value based on the determined torque of the electromechanical actuator.

Thus, the obstacle detection threshold value is determined by the manufacturer of motorized drive devices for each electromechanical actuator, so as to select an electromechanical actuator for the home-automation installation based on data related to the concealing device.

In this way, the obstacle detection threshold value associated with each electromechanical actuator cannot be adapted based on the dimensioning of the concealing device, but based on value ranges thereof pertaining to the weight of the load bar and the diameter of the winding tube.

Consequently, the use of a single obstacle detection threshold value for the selected electromechanical actuator causes different behaviors of the motorized drive device depending on the associated concealing device.

Furthermore, in a first case, the single obstacle detection threshold value may be too large relative to the dimensioning of the concealing device and may make the obstacle detection nonoperational, since the obstacle detection threshold value will never be reached, during a movement of the screen toward the unwound position. In a second case, the single obstacle detection threshold value may be too small relative to the dimensioning of the concealing device and may cause untimely obstacle detections, during a movement of the screen toward the unwound position.

Document FR 2,849,553 A1 is also known, which describes a motorized drive device for a closure home-automation installation comprising an electromechanical actuator and an obstacle detector. The electromechanical actuator comprises an electric motor and an electronic control unit. The obstacle detector uses an excess force threshold value determined automatically to allow an obstacle to be detected under various operating conditions.

The present invention aims to resolve the aforementioned drawbacks and to propose a method for configuring a motorized drive device for a closure or sun-protection home-automation installation, a method for controlling the operation of the motorized drive device configured according to the aforementioned configuration method, an associated motorized drive device and a closure or sun-protection home-automation installation comprising such a motorized drive device, making it possible to determine an obstacle detection threshold value automatically and to guarantee a similar behavior of an electromechanical actuator for various concealing devices that may be dimensioned differently.

To that end and according to a first aspect, the present invention relates to a method for configuring a motorized drive device for a closure or sun-protection home-automation installation,

- the closure or sun-protection home-automation installation comprising a concealing device,
- the concealing device comprising at least:
  - a winding tube,
  - a screen, a first end of the screen being fastened to the winding tube, and
  - a load bar, a second end of the screen being fastened to the load bar,
- the motorized drive device comprising at least:
  - an electromechanical actuator making it possible to wind and unwind the screen on the winding tube, between a wound position and an unwound position,
- the electromechanical actuator comprising at least:
  - an electric motor,
  - an output shaft connected to the winding tube of the concealing device, and
  - an electronic control unit,
- the electronic control unit comprising at least:
  - a device for measuring a parameter of an electric current traversing the electric motor, and
  - a memory storing a value of the measured parameter.

The configuration method comprises at least a step for automatically determining a low end-of-travel position of the screen.

According to the invention, the configuration method comprises at least the following steps:

- measuring the parameter of the electric current traversing the electric motor via the measuring device,
- determining a variation of the measured parameter, the steps for measuring the parameter of the electric current and determining the variation of the measured parameter being carried out during the performance of the step for automatically determining the low end-of-travel position of the screen, and determining an obstacle detection threshold value, during the movement of the screen toward the unwound position, based on the variation of the measured parameter, determined in the previous step.

Thus, the method for configuring the motorized drive device for the closure or sun-protection home-automation installation makes it possible to determine an obstacle detection threshold value automatically, during the movement of the screen toward the unwound position, and to guarantee a similar behavior of an electromechanical actuator for various concealing devices that may be dimensioned differently.

In this way, the method for configuring the motorized drive device for the closure or sun-protection home-automation installation makes it possible to adapt the obstacle detection threshold value of the motorized drive device for each concealing device, after the determination of the low end-of-travel position of the screen.

The determination of the low end-of-travel position is carried out by determining a decrease in the force created by the weight of the load bar at the electric motor of the electromechanical actuator.

The configuration of the motorized drive device implemented by determining a variation of the load at the electric motor of the electromechanical actuator, during the determination of the low end-of-travel position, corresponds to the change in state where the load bar fastened to the second end of the screen exerts a pulling force on the electric motor to that where the load bar fastened to the second end of the screen exerts a lower pulling force, or even no pulling force at all, on the electric motor.

According to one preferred feature of the invention, the step for determining a variation of the measured parameter is carried out between a moment preceding the determination of having reached the low end-of-travel position of the screen and a moment following the determination of having reached the low end-of-travel position of the screen.

According to another preferred feature of the invention, the step for automatically determining the low end-of-travel position of the screen comprises a sub-step for activating the motorized drive device, so as to move the screen toward the unwound position, a sub-step for moving the screen, then a sub-step for stopping the motorized drive device. Additionally, when the determined variation of the measured parameter is above a predetermined threshold value, the sub-step for stopping the motorized drive device is carried out.

According to another preferred feature of the invention, the configuration method comprises, following the step for determining the variation of the measured parameter, a step for confirming the low end-of-travel position of the screen.

Preferably, the step for confirming the low end-of-travel position of the screen is carried out when the determined variation of the measured parameter is above the predetermined threshold value.

Advantageously, the step for measuring the parameter of the electric current is carried out periodically.

According to a second aspect, the present invention relates to an operating method for controlling a motorized drive device for a closure or sun-protection home-automation installation. This method comprises at least the following steps:

activating the motorized drive device, so as to move the screen toward the unwound position, measuring the parameter of the electric current traversing the electric motor via the measuring device, determining a variation of the measured parameter, comparing the variation of the measured parameter to the obstacle detection threshold value determined using a method for configuring said motorized drive device according to the invention, and in particular, as mentioned above, and determining the presence or absence of an obstacle via the electronic control unit of the electromechanical actuator, based on the result of the comparison step.

Thus, the control method is carried out after configuring the motorized drive device, so as to determine, after comparing the variation of the measured parameter to the determined obstacle detection threshold value, the presence or absence of an obstacle via the electronic control device of the electromechanical actuator, based on the result of the comparison.

Preferably, the step for comparing the variation of the measured parameter to the determined obstacle detection threshold value is carried out periodically, as long as the result of the step for determining the presence or absence of an obstacle via the electronic control device of the electromechanical actuator is different from a detected obstacle.

According to a third aspect, the present invention relates to a motorized drive device for a closure or sun-protection home-automation installation. This motorized drive device comprises the electronic control unit of the electromechanical actuator configured to carry out the method for configuring the motorized drive device described above and/or the operating control method described above.

This motorized drive device has features and advantages similar to those previously described relative to the configuration and operating control methods according to the invention.

According to a fourth aspect, the present invention relates to a closure or sun-protection home-automation installation comprising a motorized drive device as set out above.

The invention also relates to a data recording medium, readable by a computer, on which a computer program is saved comprising computer code program means to carry out the steps of the configuration method previously defined and the steps of the control method previously defined.

The invention also relates to a computer program comprising computer program code means suitable for carrying out steps of the configuration method previously defined and steps of the control method previously defined, when the program is run by a computer.

Other particularities and advantages of the invention will also appear in the description below.

In the appended drawings, provided as non-limiting examples:

Figure 1:
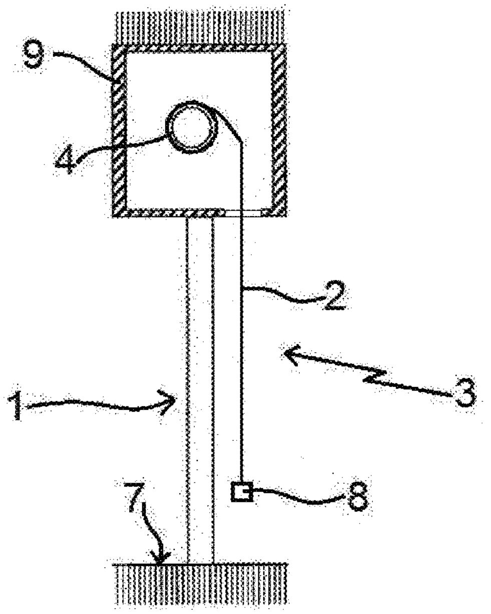
FIG. 1 is a cross-sectional schematic view of a home-automation installation according to one embodiment of the invention.
Figure 2:
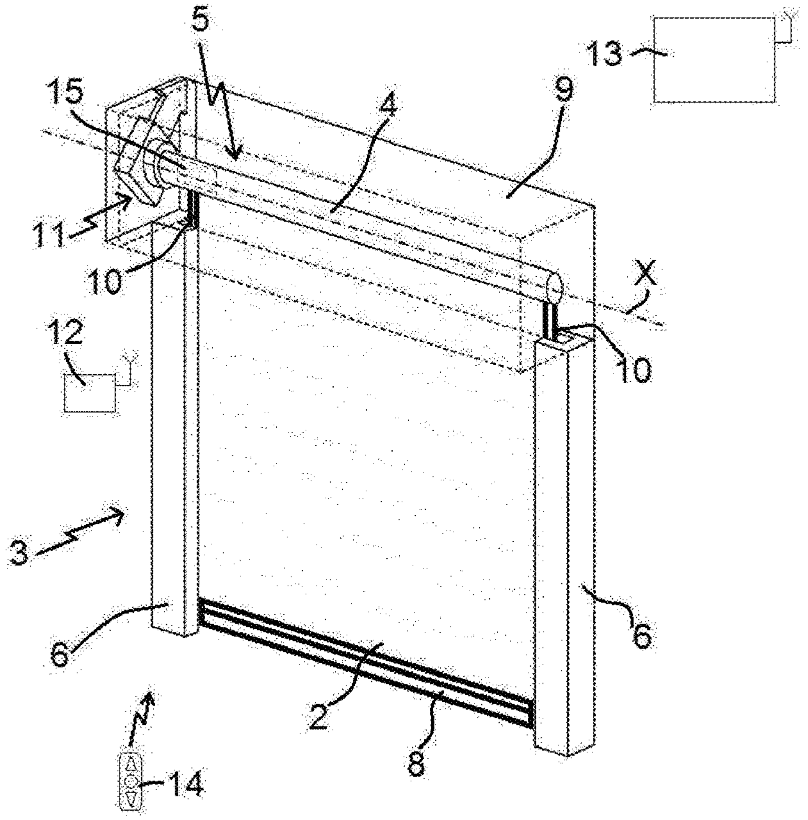
FIG. 2 is a schematic perspective view of the home-automation installation illustrated in FIG. 1.
Figure 3:
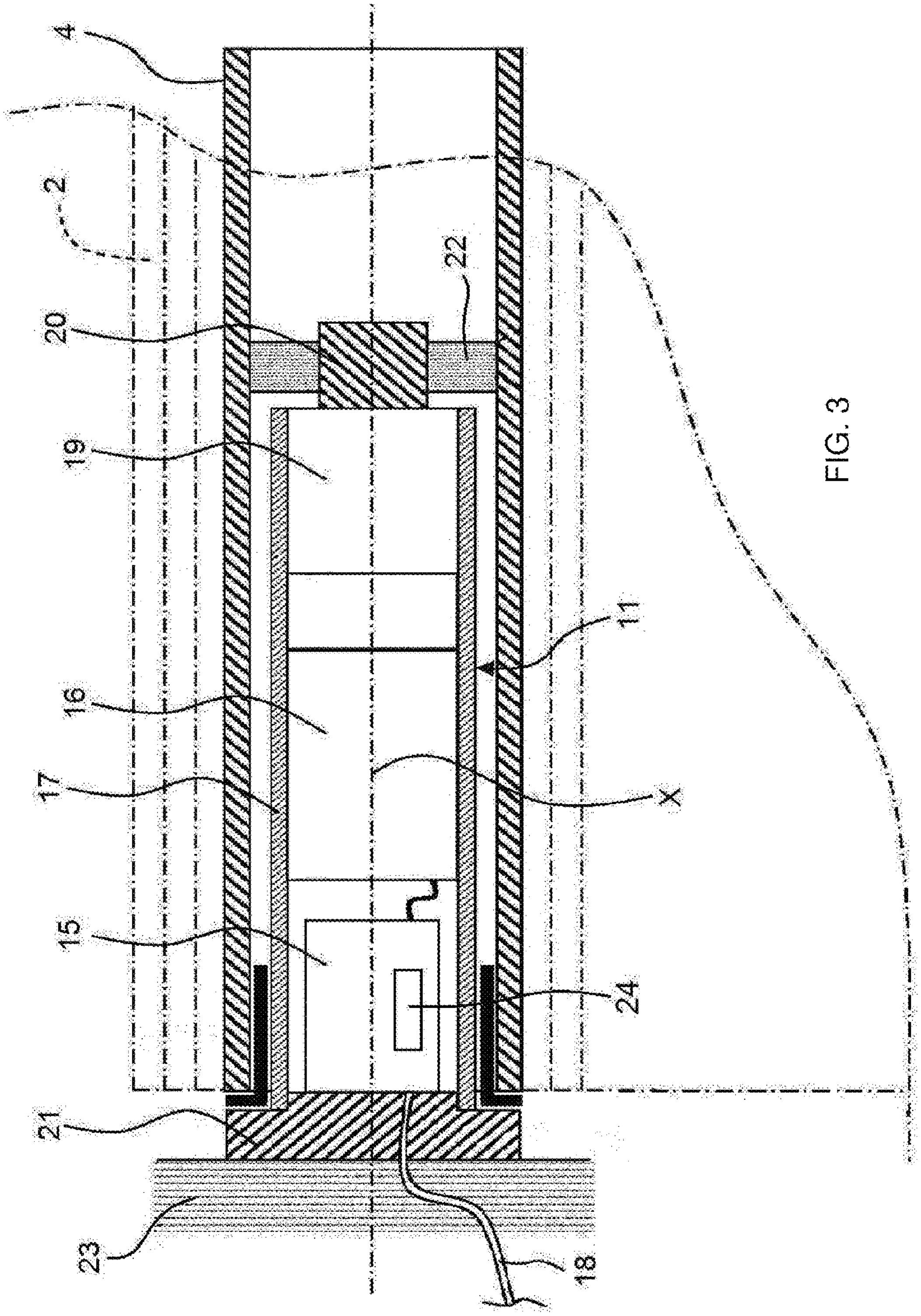
FIG. 3 is a schematic partial sectional view of the home-automation installation illustrated in FIG. 2 comprising an electromechanical actuator according to one embodiment of the invention.
Figure 4:
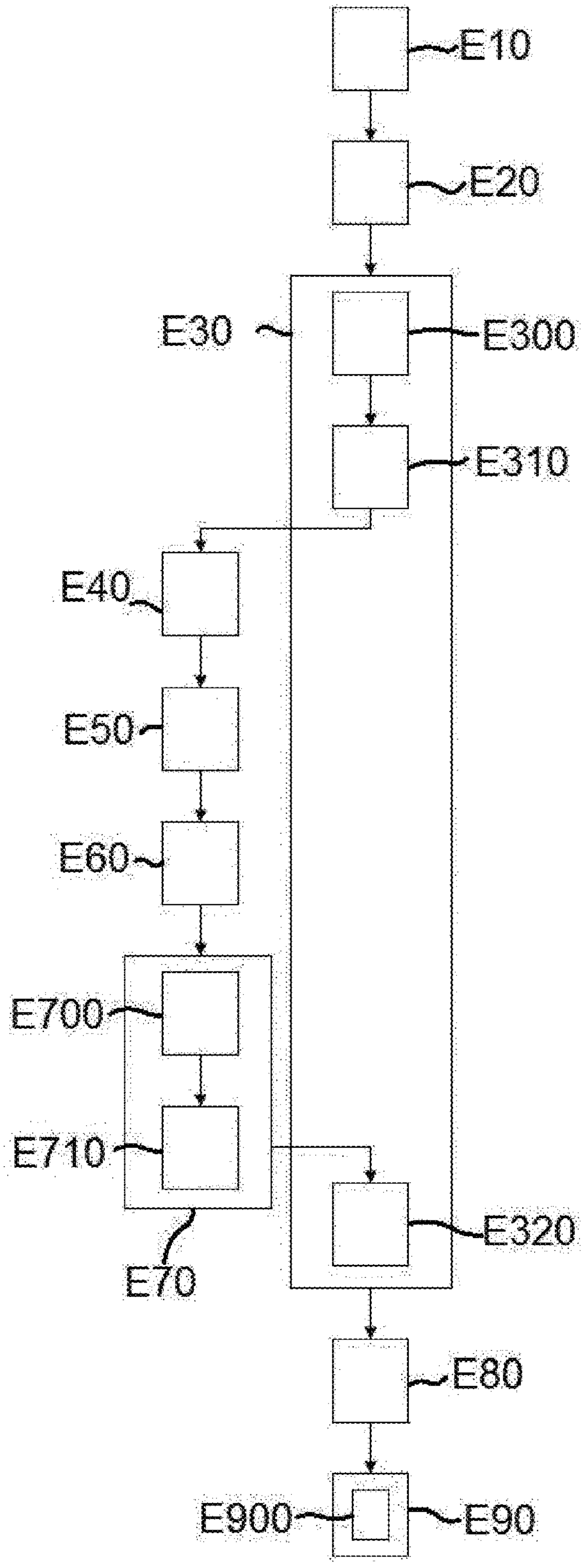
FIG. 4 is a block diagram of an algorithm of a method according to the invention, for configuring a motorized drive device of a home-automation installation illustrated in FIGS. 1 to 3.
Figure 5:
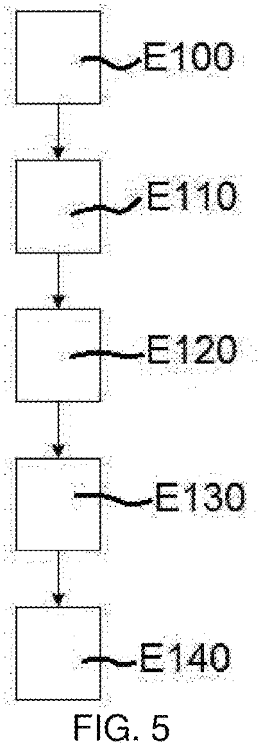
Figure 6:
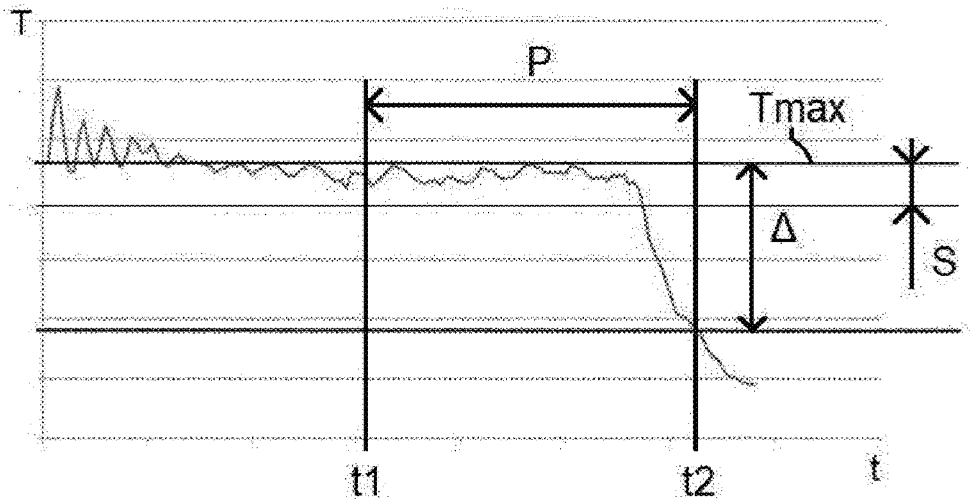

FIG. 5 is a block diagram of an algorithm of a method according to the invention, for controlling the operation of the motorized drive device of a home-automation installation illustrated in FIGS. 1 to 3; and FIG. 6 is a graph showing the evolution of a parameter of an electric current traversing the electric motor of an electromechanical actuator of the motorized drive device as a function of time, when the configuration and control methods, as shown in FIGS. 4 and 5, are carried out.

In reference to FIGS. 1 and 2, we will first describe a home-automation installation according to the invention and installed in a building comprising an opening 1, window or door, equipped with a screen 2 belonging to a concealing device 3, in particular a motorized windable blind.

The concealing device 3 is a fabric blind.

A windable blind according to one embodiment of the invention will be described in reference to FIGS. 1 and 2.

The screen 2 of the concealing device 3 is wound on a winding tube 4 driven by a motorized drive device 5 and movable between a wound position, in particular an upper position, and an unwound position, in particular a lower position.

The moving screen 2 of the concealing device 3 is a closing, concealing and/or sun-protection screen, winding on the winding tube 4, the inner diameter of which is substantially equivalent to the outer diameter of an electromechanical actuator 11, such that the electromechanical actuator 11 can be inserted into the winding tube 4, during the assembly of the concealing device 3.

The motorized drive device 5 comprises the electromechanical actuator 11, in particular of the tubular type, making it possible to set the winding tube 4 in rotation so as to unwind or wind the screen 2 of the concealing device 3.

The concealing device 3 comprises the winding tube 4 for winding the screen 2, where, in the mounted state, the electromechanical actuator 11 is inserted into the winding tube 4.

The concealing device 3 also comprises a load bar 8 for exerting tension on the screen 2.

In a known manner, the windable blind, which forms the concealing device 3, includes a fabric, forming the screen 2 of the windable blind 3. A first end of the screen 2, in particular the upper end of the screen 2 in the assembled configuration of the concealing device 3 in the home-automation installation, is fastened to the winding tube 4. Additionally, a second end of the screen 2, in particular the lower end of the screen 2 in the assembled configuration of the concealing device 3 in the home-automation installation, is fastened to the load bar 8.

Here, the fabric forming the screen 2 is made from a textile material. Furthermore, such a fabric forming the screen 2 can be provided to be impermeable to air, in other words wind-resistant.

In an example embodiment that is not shown, the first end of the screen 2 has an eyelet through which a rod is positioned, in particular made from plastic. This eyelet made at the first end of the screen 2 is obtained using a seam of the fabric forming the screen 2. During the assembly of the screen 2 on the winding tube 4, the eyelet and the rod situated at the first end of the screen 2 are inserted by sliding in a slot arranged on the outer face of the winding tube 4, in particular over the entire length of the winding tube 4, so as to be able to wind and unwind the screen 2 around the winding tube 4.

In the case of a windable blind, the upper wound position corresponds to the bearing of the load bar 8 of the screen 2 against an edge of a box 9 of the windable blind 3, and the lower unwound position corresponds to the bearing of the load bar 8 of the screen 2 against a threshold 7 of the opening 1.

The winding tube 4 is positioned inside the box 9 of the windable blind 3. The screen 2 of the windable blind 3 winds and unwinds around the winding tube 4 and is housed at least partially inside the box 9.

In general, the box 9 is positioned above the opening 1, or in the upper part of the opening 1.

In the embodiment illustrated in FIG. 2, the screen 2 also includes, at each of its lateral edges, a fastening part 10 in the form of a strip. The home-automation installation comprises two lateral guideways 6 positioned along two lateral edges of the opening 1. The lateral guideways 6 additionally respectively comprise a groove inside which a fastening part 10 of the screen 2 is retained, as well as a lateral end of the load bar 8 fastened to the second end of the screen 2.

Thus, during the winding or unwinding of the screen 2, the fastening parts 10 fastened on the lateral edges of the screen 2 and the lateral ends of the load bar 8 fastened to the second end of the screen 2 are retained in the lateral guideways 6, so as to guarantee lateral guidance of the screen 2.

Each groove arranged in a lateral guideway 6 makes it possible to prevent the withdrawal of a fastening part 10 fixed on one of the lateral edges of the screen 2, during the movement of the screen 2 between the wound position and the unwound position.

Preferably, each fastening part 10 extends along the entire length of one of the two lateral edges of the screen 2.

In one example embodiment, the fastening parts 10 are respectively fastened at a lateral edge of the screen 2 by gluing, welding or overmolding. Additionally, the fastening parts 10 can be made from plastic, and in particular, overmolded on the lateral edges of the screen 2.

Here, the lateral guideways 6 respectively positioned along a lateral edge of the opening 1 extend along a vertical direction. The lateral guideways 6 extend from the threshold 7 of the opening 1 to the box 9 of the windable blind 3.

Advantageously, trim elements, not shown, are positioned inside lateral guideways 6 and cooperate with the fastening parts 10 respectively fastened at a lateral edge of the screen 2, so as to keep the screen 2 stretched by applying a force on each fastening part 10 against a wall of the lateral guideway 6.

For example and non-limitingly, the trim elements positioned inside the lateral guideways 6 are provided with elastics, in particular made from plastic. The trim elements can also be provided in the form of foam or include a fly.

Thus, the trim elements positioned inside the lateral guideways 6 make it possible to guarantee the application of a frictional resistance on the fastening parts 10 of the screen 2, so as to keep the screen 2 stretched, during a movement of the screen 2 or when the screen 2 is kept stopped.

Advantageously, the box 9 of the blind 3 and the side guideways 6 form a frame inside which the screen 2 can be moved. This frame can be closed by an additional bar connecting the two lateral guideways 6 at the threshold 7 of the opening 1.

The motorized drive device 5 is controlled by a control unit. The control unit may for example be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured for example to determine a temperature, brightness, or wind speed.

A remote control 14, which can be a type of local control unit, and provided with a control keypad, which comprises selection and display means, further allows a user to intervene on the electromechanical actuator 11 and/or the central control unit 13.

The motorized drive device 5 is preferably configured to carry out the unwinding or winding commands of the screen 2 of the concealing device 3, which may in particular be acquired by the remote control 14.

The electromechanical actuator 11 comprises an electric motor 16. The electric motor 16 comprises a rotor and a stator, not shown and positioned coaxially around a rotation axis X, which is also the rotation axis of the winding tube 4 in the assembled configuration of the motorized drive device 5.

Control means for controlling the electromechanical actuator 11, according to the invention, making it possible to move the screen 2 of the concealing device 3, comprise at least one electronic control unit 15. This electronic control unit 15 is able to operate the electric motor 16 of the electromechanical actuator 11, and in particular to allow the supply of electricity for the electric motor 16.

Thus, the electronic control unit 15 in particular controls the electric motor 16, so as to open or close the screen 2, as previously described.

The electronic control unit 15 also comprises an order receiving module, in particular for wireless orders sent by an order transmitter such as the remote control 14 designed to control the electromechanical actuator 11 or one of the local 12 or central 13 control units.

The order receiving module can also allow the reception of orders sent by wired means.

Here, and as illustrated in FIG. 3, the electronic control unit 15 is positioned inside a casing 17 of the electromechanical actuator 11.

The control means of the electromechanical actuator 11 comprise hardware and/or software means.

As one non-limiting example, the hardware means may comprise at least one microcontroller.

The electromechanical actuator 11 belonging to the home-automation installation of FIGS. 1 and 2 will now be described in reference to FIG. 3.

The electromechanical actuator 11 is supplied with electricity by an electricity grid of the sector, or using a battery, which can for example be recharged by a photovoltaic panel. The electromechanical actuator 11 makes it possible to move the screen 2 of the concealing device 3.

Here, the electromechanical actuator 11 comprises a power supply cable 18 making it possible to supply electricity from the electricity grid of the sector.

The casing 17 of the electromechanical actuator 11 is preferably cylindrical.

In one embodiment, the casing 17 is made from a metal material. The material of the casing of the electromechanical actuator is in no way limiting and may be different, and in particular made from plastic.

The electromechanical actuator 11 also comprises a reducing gear device 19 and an output shaft 20.

Advantageously, the electric motor 16 and the reducing gear device 19 are positioned inside the casing 17 of the electromechanical actuator 11.

The output shaft 20 of the electromechanical actuator 11 is positioned inside the winding tube 4, and at least partially outside the casing 17 of the electromechanical actuator 11.

The output shaft 20 of the electromechanical actuator 11 is coupled by a connecting means 22 to the winding tube 4, in particular using a wheel-shaped connecting means.

The electromechanical actuator 11 also comprises a sealing element 21 for one end of the casing 17.

Here, the casing 17 of the electromechanical actuator 11 is fastened to a support 23, in particular a flange, of the box 9 of the concealing device 3 using the closing off element 21 forming a torque pin, in particular a closing off and torque-reacting head. In such a case where the closing off element 21 forms a torque pin, the closing off element 21 is also called a fixed point of the electromechanical actuator 11.

The electronic control unit 15 of the electromechanical actuator 11 comprises a device for detecting obstacles and ends of travel during winding of the screen 2 and during unwinding of said screen 2.

The device for detecting obstacles and ends of travel during winding and unwinding of the screen 2 is implemented using a microcontroller of the electronic control unit 15, and in particular using an algorithm implemented by this microcontroller.

The electronic control unit 15 comprises a device 24 for measuring a parameter T of an electric current traversing the electric motor 16 and a memory storing a value of the measured parameter T.

In one embodiment, the parameter T of the electric current traversing the electric motor 16 measured by the measuring device 24 is a voltage, and in particular, a voltage across the terminals of a phase shift capacitor of the electric motor 16 of the electromechanical actuator 11. The measurement of the voltage across the terminals of the phase shift capacitor of the electric motor of the electromechanical actuator is well known in the state of the art and is described, in particular, in document FR 2,849,300 A1.

The acquisition of the voltage traversing the electric motor 16 via the measuring device 24 makes it possible to obtain a signal representative of the torque generated by the electric motor 16 of the electromechanical actuator 11.

Here, the memory storing the parameter T of the electric current traversing the electric motor 16 is made up by a memory of a microcontroller of the electronic control unit 15, in particular a memory of the EEPROM (Electrically Erasable Programmable Read Only Memory) type.

The motorized drive device 5 is provided to operate at least in a control mode and a configuration mode.

The selection of the electromechanical actuator 11 for the concealing device 3 is made by calculating the torque of the electromechanical actuator 11, in particular by the installer, based on the size of the concealing device 3, and in particular, using an abacus taking account of the weight of the load bar 8 and the diameter of the winding tube 4.

In reference to FIG. 4, we will now describe one embodiment of a method for configuring the motorized drive device 5 of the home-automation installation illustrated in FIGS. 1 to 3.

In FIG. 6, the graph shows, by a curve using a solid line, the evolution of the voltage value T of the electric current traversing the electric motor 16, as a function of time t.

The time t is shown on the x-axis, and the voltage value T is shown on the y-axis.

In this embodiment, the configuration method of the motorized drive device 5 of the home-automation installation comprises a step E30 for automatically determining a low end-of-travel position of the screen 2.

Thus, the step E30 for automatically determining the low end-of-travel position of the screen 2 makes it possible to delimit the movement travel of the screen 2 of the concealing device 3, during the lowering of the screen 2.

Step E30 for automatically determining the low end-of-travel position of the screen 2 comprises a sub-step E300 for activating the motorized drive device 5, so as to move the screen 2 toward the unwound position.

The sub-step E300 for activating the motorized drive device 5 is carried out by pressing on a programming selection element of a control point 12, 14, in particular of the remote control 14.

Here, the selection element of the control point 12, 14 is the selection element for lowering of the screen 2.

After the sub-step E300 for activating the motorized drive device 5, step E30 for automatically determining the low end-of-travel position of the screen 2 comprises a sub-step E310 for moving the screen 2, in particular until reaching a stop, as defined below by step E70, then a sub-step E320 for stopping of the motorized drive device 5.

In one embodiment, the step E30 for automatically determining the low end-of-travel position of the screen 2 may also be associated with a step for automatically determining a high end-of-travel position of the screen 2.

The steps for automatically determining the low and high end-of-travel positions of the screen 2 can be carried out consecutively, in particular through a same sub-step for activating the motorized drive device 5.

The step E30 for automatically determining the low end-of-travel position of the screen 2 is preceded by a step E10 for entering the configuration mode of the motorized drive device 5.

The entry in the configuration mode of the motorized drive device 5 may be implemented by switching between the control mode and the configuration mode of the motorized drive device 5.

Advantageously, the electronic control unit 15 of the electromechanical actuator 11 is configured to switch from a control mode of the motorized drive device 5 to a configuration mode of the motorized drive device 5, and vice versa.

In one embodiment, the step E10 for entering the configuration mode of the motorized drive device 5 is carried out by pressing on the programming selection element of a control point 12, 14, in particular the remote control 14.

In another embodiment, the step E10 for entering the configuration mode of the motorized drive device 5 is carried out by simultaneously pressing on two selection elements of a control point 12, 14, in particular the remote control 14, for example the selection elements for raising and lowering the screen 2.

After the motorized drive device 5 has entered the configuration mode, the method comprises a step E20 for signaling the configuration mode.

In practice, the signaling step E20 is carried out by a movement of the screen 2 controlled by the motorized drive device 5.

Preferably, the movement of the screen 2 corresponds to a round-trip movement of the screen 2, in particular over a short distance that may for example be around one centimeter.

Here, the signaling step E20 is carried out after the step E10 for entering the configuration mode of the motorized drive device 5 and before the step E30 for automatically determining the low end-of-travel position of the screen 2.

The configuration method comprises a step E40 for measuring the parameter T of the electric current traversing the electric motor 16 via the measuring device 24, as illustrated in FIG. 6.

Advantageously, the step E40 for measuring the parameter T of the electric current is carried out periodically.

By way of non-limiting example, the step E40 for measuring the parameter T of the electric current is carried out every 20 milliseconds.

The method comprises a step E50 for storing values of the parameter T measured with a predetermined frequency.

Advantageously, the step E50 for storing values of the measured parameter T is carried out according to the implementation frequency of the step E40 for measuring the parameter T of the electric current.

The values of the measured parameter T, stored during step E50, are kept for a predetermined movement period P of the screen 2 toward the unwound position, during the sub-step E310 for moving the screen 2 belonging to the step E30 for automatically determining the low end-of-travel position of the screen 2.

The method comprises a step E60 for determining a maximum value Tmax of the measured parameter T from among the values of the measured parameter T, stored during step E50, during the predetermined movement period P of the screen 2 toward the unwound position.

The configuration method comprises a step E70 for determining a variation Δ of the measured parameter T.

Advantageously, the values of the measured parameter T making it possible to determine the variation Δ of the measured parameter T are temporarily stored in a buffer memory of the electronic control unit 15, and in particular the microcontroller 27.

The steps E40 for measuring the parameter T of the electric current and E70 for determining the variation Δ of the measured parameter T are carried out during the performance of the step E30 for automatically determining the low end-of-travel position of the screen 2.

Preferably, the step E70 for determining the variation Δ of the measured parameter T is carried out between a moment t1 preceding the determination of having reached the low end-of-travel position of the screen 2 and a moment t2 following the determination of having reached the low end-of-travel position of the screen 2, as illustrated in FIG. 6.

In practice, the step E70 for determining the variation Δ of the measured parameter T is carried out using the electronic control unit 15, and in particular the measuring device 24 and a microcontroller of the electronic control unit 15.

Here, the step E70 for measuring the variation Δ of the measured parameter T is carried out after the execution of steps E50 for storing the measured parameter T and E60 for determining the maximum value Tmax of the measured parameter T during the predetermined period P.

In one embodiment, the step E70 for determining the variation Δ of the measured parameter T is carried out by determining a deviation between the maximum value Tmax of the measured parameter T during the predetermined period P and the last value of the measured parameter T during the predetermined period P.

Here, the step E70 for determining the variation Δ of the measured parameter T corresponds to the detection of a deviation of the measured parameter T by the electronic control unit 15, in particular a deviation of the voltage across the terminals of a phase shift capacitor of the electric motor 16 of the electromechanical actuator 11.

The variation Δ of the measured parameter T is determined from the implementation of step E40 for measuring the parameter T of the electric current according to a predetermined frequency, step E50 for storing values of the measured parameter T according to the predetermined frequency and step E60 for determining the maximum value Tmax of the measured parameter T during the predetermined period P.

Step E70 for determining the variation Δ of the measured parameter T comprises a sub-step E700 for comparing the maximum value Tmax of the measured parameter T during the predetermined period P with the last value of the measured parameter T during the predetermined period P and a sub-step E710 for calculating the difference between the maximum value Tmax of the measured parameter T during the predetermined period P and the last value of the measured parameter T during the predetermined period P, so as to determine the variation Δ of the measured parameter T.

The sub-steps E700, E710 belonging to step E70 for determining the variation Δ of the measured parameter T are reiterated upon each new measurement of the parameter T of the electric current, in step E40.

The sub-steps E700, E710 belonging to step E70 for determining the variation Δ of the measured parameter T are carried out until the sub-step E320 of the motorized drive device 5 belonging to step E30 for automatically determining the low end-of-travel position of the screen 2.

In another embodiment, the step E70 for determining the variation Δ of the measured parameter T is carried out by determining a deviation between a mean value of at least part of the values of the measured parameter T during the predetermined period P and the last value of the measured parameter T during the predetermined period P.

The configuration method comprises, following the step E70 for determining the variation Δ of the measured parameter T, a step E80 for confirming the low end-of-travel position of the screen 2.

The step E80 for confirming the low end-of-travel position of the screen 2 is carried out by the user.

In one embodiment, the step E80 for confirming the low end-of-travel position of the screen 2 is carried out by pressing on a selection element of a control point 12, 14, in particular the remote control 14.

As a non-limiting example, the step E80 for confirming the low end-of-travel position of the screen 2 is carried out by pressing on the selection element of the control point 12, 14 corresponding to stopping of the movement of the screen 2.

Furthermore, the step E80 for confirming the low end-of-travel position of the screen 2 is carried out by pressing on a selection element of a control point 12, 14 during a predetermined period of time.

As a non-limiting example, the predetermined time period during which the pressing on a selection element of a control point 12, 14 is done to confirm the low end-of-travel position of the screen 2 is approximately two seconds.

Advantageously, the step E80 for confirming the low end-of-travel position of the screen 2 is carried out when the determined variation Δ of the measured parameter T, during step E70, is above the predetermined threshold value S.

As a non-limiting example, the predetermined threshold value S may be comprised in a range extending from 4 N.m to 6 N.m, N.m being the symbol for the unit of measure of a torque in Newton meters.

The predetermined threshold value S depends on the maximum value of the torque delivered by the electromechanical actuator 11.

In practice, when the determined variation Δ of the measured parameter T, during step E70, is above the predetermined threshold value S, the sub-step E320 for stopping the motorized drive device 5 belonging to the step E30 for automatically determining the low end-of-travel position of the screen 2 is carried out.

In this way, step E70 for determining the variation Δ of the measured parameter T is carried out until the sub-steps E310 for moving the screen 2 and E320 for stopping the motorized drive device 5 belonging to step E30 for automatically determining the low end-of-travel position of the screen 2.

In such a case, the sub-step E320 for stopping the motorized drive device 5 is carried out automatically by the electronic control unit 15 of the electromechanical actuator 11.

When step E80 for confirming the low end-of-travel position of the screen 2 is carried out, the method comprises a step for storing the determined variation Δ of the measured parameter T, during step E70.

The determined variation Δ of the measured parameter T is preferably recorded in a memory of a microcontroller of the electronic control unit 15.

In the case where the determined variation Δ of the measured parameter T, during step E70, is above the predetermined threshold value S and the latter does not correspond to the actual low end-of-travel position of the screen 2, the sub-steps E300, E310 for activating the motorized drive device 5 and moving the screen 2 belonging to the step E30 for automatically determining the low end-of-travel position of the screen 2 are carried out again, so as to determine another variation Δ of the measured parameter T.

Thus, steps E40 to E70 of the configuration method are reiterated after the new execution of the sub-steps E300, E310 for activating the motorized drive device 5 and moving the screen 2 belonging to step E30 for automatically determining the low end-of-travel position of the screen 2.

The configuration method comprises a step E90 for determining an obstacle detection threshold value $S_O$, during the movement of the screen 2 toward the unwound position, based on the variation Δ of the measured parameter T.

Thus, the method for configuring the motorized drive device 5 for the closure or sun-protection home-automation installation makes it possible to determine an obstacle detection threshold value $S_O$ automatically, during the movement of the screen 2 toward the unwound position, and to guarantee a similar behavior of an electromechanical actuator 11 for various concealing devices 3 that may be dimensioned differently, in particular a different winding tube 4 diameter or a different screen 2 width and/or length.

In this way, the method for configuring the motorized drive device 5 of the closure or sun-protection home-automation installation makes it possible to adapt the obstacle detection threshold value $S_O$ of the motorized drive device 5 for each concealing device 3, after the determination of the low end-of-travel position of the screen 2.

In practice, the step E90 for determining the obstacle detection threshold value $S_o$ is carried out using the electronic control unit 15, and in particular a microcontroller of the electronic control unit 15.

Preferably, the obstacle detection threshold value $S_O$ is lower than the variation Δ of the measured parameter T, and in particular corresponds to a percentage of the variation Δ of the measured parameter T.

In one embodiment, the step E90 for determining the obstacle detection threshold value $S_O$ comprises a sub-step E900 for calculating the obstacle detection threshold value $S_O$ as a function of a predetermined ratio of the variation Δ of the measured parameter T.

Advantageously, the step E90 for determining the obstacle detection threshold value $S_O$ is carried out after step E80 for confirming the low end-of-travel position of the screen 2.

The method for configuring the motorized drive device 5 of the closure or sun-protection home-automation installation therefore makes it possible to configure the obstacle detection threshold value $S_O$ automatically, based on the dimensioning of the concealing device 3.

Here, during step E90 for determining the obstacle detection threshold value $S_O$, the obstacle detection threshold value $S_O$ is calculated automatically, in particular by the electronic control unit 15, based on the variation Δ of the measured parameter T.

The determination of the low end-of-travel position of the screen 2 is carried out by determining a decrease in the force created by the weight of the load bar 8 at the electric motor 16 of the electromechanical actuator 11, or even the transition from a drive load to a zero load at the electric motor 16 of the electromechanical actuator 11.

The load is said to be drive at the electric motor 16 of the electromechanical actuator 11 during the movement of the screen 2 toward the unwound position, since the load bar 8 fastened to the second end of the screen 2 exerts a pulling force on the electric motor 16. The pulling force exerted on the electric motor 16 is due to the weight of the load bar 8 fastened to the second screen 2.

The load is said to be zero at the electric motor 16 of the electromechanical actuator 11 when a low end-of-travel position of the screen 2 is reached or when the load bar 8 fastened to the second screen 2 encounters an obstacle. In such a case, the load bar 8 fastened to the second end of the screen 2 exerts no pulling force on the electric motor 16, since the load bar 8 rests either on the threshold 7 of the opening 1 of the home-automation installation or an obstacle.

The configuration of the motorized drive device 5 implemented by determining a variation of the load at the electric motor 16 of the electromechanical actuator 11, during the determination of the low end-of-travel position of the screen 2, corresponds to the change in state where the load bar 8 fastened to the second end of the screen 2 exerts a pulling force on the electric motor 16 to that where the load bar 8 fastened to the second end of the screen 2 exerts a lower pulling force, or even no pulling force at all, on the electric motor 16.

The determination of the variation Δ of the measured parameter T, during the determination step E70, makes it possible to determine an image of the weight of the load bar 8 fastened to the second screen 2, so as to adapt the obstacle detection threshold value $S_O$, during the movement of the screen 2 toward the unwound position.

During the step E30 for automatically determining the low end-of-travel position of the screen 2, the determination of the variation Δ of the measured parameter T is implemented, taking into consideration that no obstacle is arranged between the load bar 8 of the screen 2 and the threshold 7 of the opening 1 of the home-automation installation.

Furthermore, such a configuration method may be implemented irrespective of the concealing device 3 and irrespective of the torque supplied by the electromechanical actuator 11.

Such a configuration method, in which the determination of the obstacle detection threshold value $S_O$, during a movement of the screen 2 toward the unwound position, is implemented using software via the electronic control unit 15 of the electrochemical actuator 11, makes it possible to minimize the costs of obtaining the motorized drive device 5.

In reference to FIG. 5, we will now describe an embodiment of a method for controlling the operation of the motorized drive device 5 of the home-automation installation illustrated in FIGS. 1 to 3.

The method for controlling the operation of the motorized drive device 5 comprises a step E100 for activating the motorized drive device 5, so as to move the screen 2 toward the unwound position, a step E110 for measuring the parameter T of the electric current traversing the electric motor 16 via the measuring device 24, a step E120 for determining a variation Δ of the measured parameter T, a step E130 for comparing the variation Δ of the measured parameter T relative to the obstacle detection threshold value $S_O$ determined according to the configuration method, and a step E140 for determining the presence or absence of an obstacle via the electronic control unit 15 of the electromechanical actuator 11, based on the result of the comparison step E130.

The obstacle detection threshold value $S_O$ taken into consideration to detect an obstacle, during a control mode of the motorized drive device 5, is that which is determined in step E90 for determining an obstacle detection threshold value $S_O$ of the configuration method.

The determination of the variation Δ of the measured parameter T during step E120 of the control method is carried out similarly to the determination of the variation Δ of the parameter T measured during step E70 of the configuration method.

Thus, the control method is carried out after configuring the motorized drive device 5, so as to determine, after comparing, in step E130, the determined variation Δ of the measured parameter T, during step E120 of the control method, to the determined obstacle detection threshold value $S_O$, during step E90 of the configuration method, the presence or absence of an obstacle via the electronic control device 15 of the electromechanical actuator 11, based on the result of the comparison.

In this way, the detection of an obstacle by the electronic control unit 15 of the electromechanical actuator 11, during the movement of the screen 2 toward the unwound position, is effective irrespective of the dimensioning of the concealing device 3.

The presence of an obstacle is determined when the variation Δ of the measured parameter T is greater than or equal to the obstacle detection threshold value $S_O$ determined according to the configuration method.

The absence of an obstacle is determined when the variation Δ of the measured parameter T is below the obstacle detection threshold value $S_O$ determined according to the configuration method.

Monitoring the torque generated by the electric motor 16 of the electromechanical actuator 11 through the measurement of the parameter T, in particular the voltage, of the electric current traversing the electric motor 16 by the measuring device 24 makes it possible to guarantee the determination reliability of the absence or presence of an obstacle.

Using the measurement of the parameter T, in particular the voltage, of the electric current traversing the electric motor 16 makes it possible to guarantee the determination reactivity of the presence or absence of an obstacle and to eliminate measuring uncertainties related to a measuring chain including one or several sensors.

Using the measurement of the parameter T, in particular the voltage, of the electric current traversing the electric motor 16 makes it possible to determine a sampling frequency based on the desired precision of the determination of the presence or absence of an obstacle. This sampling frequency of the parameter T of the electric current traversing the electric motor 16 is thus independent of the voltage of the power supply grid of the electromechanical actuator 11, and in particular its frequency.

Preferably, step E130 for comparing the variation Δ of the measured parameter T to the determined obstacle detection threshold value $S_O$ is carried out periodically, as long as the result of the step E140 for determining the presence or absence of an obstacle via the electronic control unit 15 of the electromechanical actuator 11 is different from a detected obstacle.

When the concealing device 3 has a lightweight load bar 8, the electronic control unit 15 detects an obstacle sensitively, since the obstacle detection threshold value $S_O$ is adapted to the dimensioning of the concealing device 3, and in particular to the weight of the load bar 8 fastened to the second end of the screen 2.

When the concealing device 3 has a heavy load bar 8, the electronic control unit 15 does not detect a hard spot as an obstacle, during sliding of the screen 2 in the side guideways 6, since the obstacle detection threshold value $S_O$ is adapted to the dimensioning of the concealing device 3, and in particular to the weight of the load bar 8 fastened to the second end of the screen 2.

Furthermore, the detection of an obstacle by the electronic control unit 15 of the electromechanical actuator 11, during the movement of the screen 2 toward the unwound position, is robust and makes it possible to eliminate untimely detections, which may occur in the case at hand through the use of a single obstacle detection threshold value for different concealing devices 3 determined outside actual operating conditions of the motorized drive device 5 in the home-automation installation.

In this way, the control method makes it possible to guarantee the protection of the motorized drive device 5 and the home-automation installation, while limiting untimely movement stops of the screen 2 toward the unwound position.

Such a control method, in which the determination of the presence or absence of an obstacle, during a movement of the screen 2 toward the unwound position, is implemented using software via the electronic control unit 15 of the electrochemical actuator 11, makes it possible to minimize the costs of obtaining the motorized drive device 5.

In practice, step E130 for comparing the variation Δ of the measured parameter T to the determined obstacle detection threshold value $S_o$ is carried out using the electronic control unit 15, and in particular a microcontroller of the electronic control unit 15.

Owing to the present invention, the method for configuring the motorized drive device for the closure or sun-protection home-automation installation makes it possible to determine an obstacle detection threshold value automatically, during the movement of the screen toward the unwound position, and to guarantee a similar behavior of an electromechanical actuator for various concealing devices that may be dimensioned differently.

In this way, the method for configuring the motorized drive device for the closure or sun-protection home-automation installation makes it possible to adapt the obstacle detection threshold value of the motorized drive device for each concealing device, after the determination of the low end-of-travel position.

In practice, a data recording medium, readable by a computer, is integrated into the home-automation installation and serves to store a computer program comprising codes to carry out the steps E10 to E90 of the configuration method and steps E100 to E140 of the control method described above. The invention also relates to this data recording medium and this computer program.

Of course, many changes can be made to the example embodiments previously described without going beyond the scope of the invention defined by the claims.

In particular, the electric motor of the electromechanical actuator can be of the asynchronous type, DC type, or of the brushless DC type with electronic switching, also called "BLDC" (BrushLess Direct Current) or synchronous with permanent magnets.

Furthermore, the measured parameter T of the electric current traversing the electric motor 16 can be different from its voltage. It may in particular involve its intensity.

Furthermore, the considered embodiments and alternatives may be combined to generate new embodiments of the invention.

The invention claimed is:

1. A method for configuring a motorized drive device for a closure or sun-protection home-automation installation,
- the closure or sun-protection home-automation installation comprising a concealing device,
- the concealing device comprising at least:
  - a winding tube,
  - a screen, a first end of the screen being fastened to the winding tube, and
  - a load bar, a second end of the screen being fastened to the load bar,
- the motorized drive device comprising at least:
  - an electromechanical actuator making it possible to wind and unwind the screen on the winding tube, between a wound position and an unwound position,
- the electromechanical actuator comprising at least:
  - an electric motor,
  - an output shaft connected to the winding tube of the concealing device, and
  - an electronic control unit,
- the electronic control unit comprising at least:
  - a device for measuring the value of a parameter of an electric current traversing the electric motor, and
  - a memory storing a value of the measured parameter, said method comprises at least:
  - a step for automatically determining a low end-of-travel position of the screen,
- wherein said method comprises at least the following steps:
  - measuring the parameter of the electric current traversing the electric motor via the measuring device,
  - determining a variation of the measured parameter,
    - the steps for measuring the parameter of the electric current and for determining the variation of the measured parameter being carried out during the performance of the step for automatically determining the low end-of-travel position of the screen, and
  - determining an obstacle detection threshold value, during the movement of the screen toward the unwound position, based on the variation of the measured parameter, determined in the step for determining a variation of the measured parameter.

2. The method for configuring a motorized drive device of a closure or sun-protection home-automation installation according to claim 1, wherein the step for determining a variation in the measured parameter is carried out between a moment preceding the determination of having reached the low end-of-travel position of the screen and a moment following the determination of having reached the low end-of-travel position of the screen.

3. The method for configuring a motorized drive device of a closure or sun-protection home-automation installation according to claim 1, wherein the step for automatically determining the low end-of-travel position of the screen comprises a sub-step for activating the motorized drive device, so as to move the screen toward the unwound position, a sub-step for moving the screen, then a sub-step for stopping the motorized drive device, and wherein when the variation of the measured parameter, determined during the step for determining a variation of the measured parameter, is above a predetermined threshold value, the sub-step for stopping the motorized drive device is carried out.

4. The method for configuring a motorized drive device of a closure or sun-protection home-automation installation according to claim 1, wherein said method comprises, following the step for determining the variation of the measured parameter, a step for confirming the low end-of-travel position of the screen.

5. The method for configuring a motorized drive device of a closure or sun-protection home-automation installation according to claim 3, wherein said method comprises, following the step for determining the variation of the measured parameter, a step for confirming the low end-of-travel position of the screen and wherein the step for confirming the low end-of-travel position of the screen is carried out when the variation of the measured parameter, determined during the step for determining a variation of the measured parameter, is above the predetermined threshold value.

6. The method for configuring a motorized drive device of a closure or sun-protection home-automation installation according to claim 1, wherein the step for measuring the parameter of the electric current is carried out periodically.

7. An operating method for controlling a motorized drive device for a closure or sun-protection home-automation installation, wherein method comprises at least the following steps:

activating the motorized drive device, so as to move a screen toward an unwound position, measuring a parameter of an electric current traversing an electric motor via a measuring device, determining a variation of the measured parameter, comparing the variation of the measured parameter, during the determination step, to an obstacle detection threshold value determined using a method for configuring said motorized drive device according to claim 1, and determining the presence or absence of an obstacle via the electronic control unit of the electromechanical actuator, based on the result of the comparison step.

8. The operating control method of a motorized drive device of a closure or sun-protection home-automation installation according to claim 7, wherein step for comparing the variation of the measured parameter to the determined obstacle detection threshold value is carried out periodically, as long as the result of the step for determining the presence or absence of an obstacle via the electronic control unit of the electromechanical actuator is different from a detected obstacle.

9. A motorized drive device of a closure or sun-protection home-automation installation, wherein an electronic control unit of an electromechanical actuator is configured to carry out an operating control method according to claim 7.

10. A closure or sun-protection home-automation installation, wherein said home-automation installation comprises a motorized drive device according to claim 9.

11. A motorized drive device of a closure or sun-protection home-automation installation, wherein an electronic control unit of an electromechanical actuator is configured to carry out a configuration method according to claim 1.

12. A closure or sun-protection home-automation installation, wherein said home-automation installation comprises a motorized drive device according to claim 11.

* * * * *